Oct. 2, 1951  P. P. SIMPSON, SR  2,569,833
LIVE BAIT TRAP AND CONTAINER
Filed Feb. 3, 1947
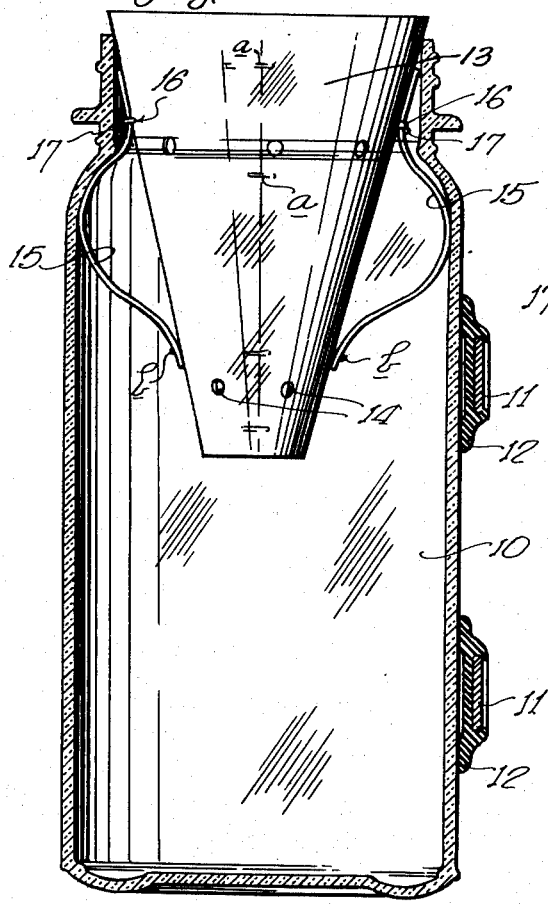
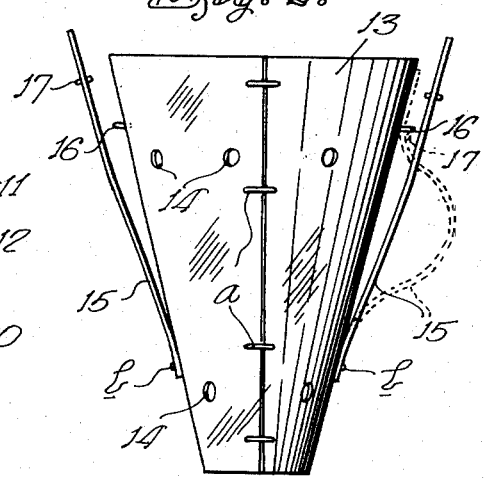
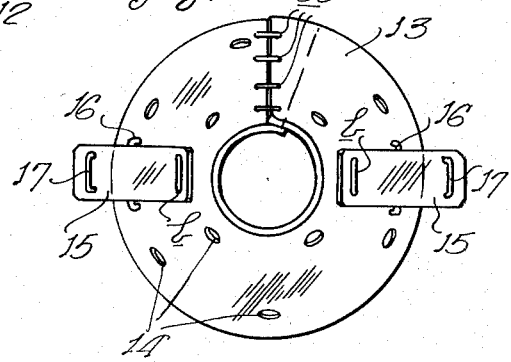
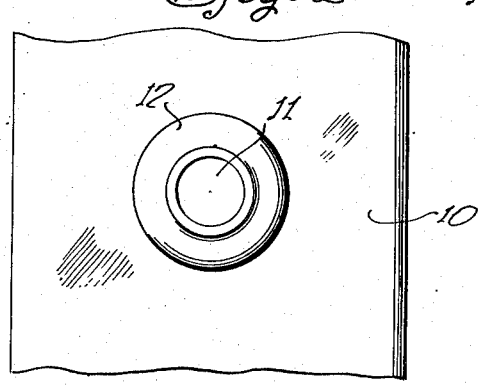
Park P. Simpson Sr.
INVENTOR.
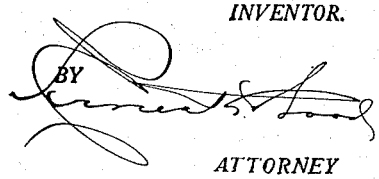
ATTORNEY Patented Oct. 2, 1951

2,569,833

UNITED STATES PATENT OFFICE 2,569,833

LIVE BAIT TRAP AND CONTAINER

Park P. Simpson, Sr., Dallas, Tex.

Application February 3, 1947, Serial No. 726,095

2 Claims. (Cl. 43—100)

This invention relates to fishermen's supplies and equipment and more particularly to a live bait trap.

The principal object of the invention is to improve upon conventional funnel type traps of the kind ordinarily inserted into fruit jars or other vessels, by providing a funnel of transparent material having affixed thereto at their lower ends, a pair of straps of resilient material adapted to be bowed outwardly and releasably held in this position by means of a retainer for the opposite or upper ends of the straps, the latter, when bowed, serving to hold the funnel in the neck of a fruit jar or like vessel.

Another object of the invention is to provide a minow trap consisting of a frusto-coniform body of transparent material in which the diametrically opposed straps for retaining the body in the neck of a vessel may be detached at their upper ends to lie parallel with the sides of the body when not in use, such latter position of the straps being effected when the devices are to be packed, shipped or stored in nested relationship to avoid distorting the body and to conserve space.

Another object of the invention is to provide a minnow trap consisting of a funnel-shaped transparent body, held by outwardly bowed straps, in the neck of a fruit jar against outward displacement, the large end of the body being of greater diameter than that of the mouth of the jar to prevent inward displacement of the body.

With the foregoing and other objects in view the invention has further reference to certain features of accomplishment which will become apparent as the description proceeds, taken in connection with the accompanying drawings wherein:

Figure 1 is a side elevational view in vertical section, showing a fruit jar and the trap attachment of the present invention therein.

Figure 2 is a side elevational view of the invention, per se.

Figure 3 is a bottom plan view thereof, and

Figure 4 is a fragmentary detail view of the fruit jar, showing one of the weights attached thereto by a suction cup to submerge the jar.

Continuing with a more detailed description of the drawing, reference is primarily made to Figures 1 and 2 wherein numeral 10 denotes a common fruit jar, preferably of the square type, which serves as the vessel for entrapping small fish used as bait for larger ones. In order that the jar, when submerged in water, may be controlled and held on a horizontal plane, it is desirable to provide one or more weights 11 which are preferably adjustable on and removable from the outer surface of the jar by virtue of rubber suction cups 12. The tendency of the jar is to sink, upon filling with water, with the base downward and will remain in this position unless forcibly held on a horizontal plane. Obviously, since the fish usually swim along horizontal paths, the likelihood of entrapping them is small while the jar is in a vertical position.

Accordingly, by positioning one or more of the weights 11 at or adjacent to the open end of the jar, the latter will assume the desired horizontal position best suited for trapping the bait.

Adapted for insertion into the mouth of the jar 10 is a transparent body 13 of frusto-coniform shape. This body or funnel, as it will be hereinafter referred to, is made preferably from a blank cut from resilient plastic material and when shaped as shown, is stapled at $a$ to secure the overlapping edges together. Apertures 14 are made in the funnel 13 for free circulation of water.

Also stapled at $b$ to the funnel 13 at their lower ends is a pair of straps 15, one on each side thereof. When not in use, these straps lie flush against the walls of the funnel, in which position several of the funnels may be nested together to protect both the funnels and straps in storing, packing and shipping and further, the arrangement conserves space.

Adjacent to the large end of the funnel 13 is a staple 16, under which the end of its respective strap 15 is inserted, in the manner shown in Figure 1 and in dotted lines in Figure 2. Another staple 17 is set adjacent the end of each strap to serve as a stop when the upper ends of the straps are inserted under the staple 16. In the latter position the straps 15 are bowed outwardly and, because of the fact that the bights of the bows are disposed approximately midway of the ends of the funnel, there is sufficient clearance between them and the neck of the jar 10 to admit them, and due to the high degree of resistency of the material of which the straps are made, they are readily distorted or sprung in an upwardly direction by downward pressure on the large end of the funnel. Of course, when the funnel assumes proper position in the jar, the straps spring outwardly to again form the bows, as shown, which lie under the shoulders of the jar, holding the funnel against outward displacement in the jar. The large end of the funnel, being slightly larger than the opening of the jar, prevents the funnel from being thrust too far into the jar. In removing the funnel, the straps 15 are collapsed downwardly by an outward pull on the funnel.

In using the trap, a small quantity of corn meal or other recognized lure for minnows is placed in the jar 10, the weights 11 suitably adjusted and the jar lowered by means of a line (not shown) into water inhabited by minnows.

Upon entrapping the minnows, the latter may be preserved in a live condition in the jar if the latter is permitted to remain in the water from which they were taken. Otherwise, the minnows may be transferred to other types of vessels better suited for preserving live bait.

It is apparent, that while the funnel has been described as being of transparent plastic and the strap 15 of the same material, the device may be made of other material or a combination of different materials. Other minor changes may be resorted to from time to time without departing from the spirit and intent of the invention, as set forth in the annexed claims therefor.

What is claimed is:

1. In a live bait trap, the combination with a fruit jar having a shoulder, of a frusto-coniform and perforated body of transparent material, whose large end is slightly greater in diameter than the inner diameter of the neck of said fruit jar above said shoulder, diametrically opposed straps of resilient, distortable material on said body, said straps being of equal width throughout their length and attached to said body at both ends below the point of greatest diameter thereof and outwardly bowed intermediate their ends and loops secured to the body at diametrically opposite sides thereof near the large end thereof, said strips having end portions slidable along said body while confined by said loops adapted to yield to said shoulder during passage of said body into and out of the neck of said fruit jar and effective upon resuming their normal shape within said jar, to retain said body therein by their engagement with said shoulder.

2. In combination with a fruit jar having a shoulder, a live bait trap comprising a funnel-shaped body of perforated, transparent material receivable in the neck of said fruit jar, resilient straps diametrically opposed on said body of the same material as said body and of equal width throughout their length and attached to said body at their ends to a point spaced below the largest end of said body to define outwardly extending bows and loops secured to the body at diametrically opposite sides thereof near the large end thereof, said strips having end portions slidable along said body while confined by said loops adapted to yield towards an end of said body during passage of the latter into and out of the neck of said jar and adapted, upon restoration to their normal shape within said jar, to engage under the shoulder of the latter and preclude displacement of said body from said jar.

PARK P. SIMPSON, Sr.

REFERENCES CITED

The following references are of record in the file of this patent:

UNITED STATES PATENTS

| Number | Name | Date |
| --- | --- | --- |
| 474,036 | Wood | May 3, 1892 |
| 716,533 | Harker | Dec. 23, 1902 |
| 1,139,717 | Pipenhagen | May 18, 1915 |
| 1,387,716 | Hofley | Aug. 16, 1921 |
| 2,015,277 | McCullough | Sept. 24, 1935 |
| 2,169,217 | Brown | Aug. 15, 1939 |
| 2,361,321 | Schleier | Oct. 24, 1944 |

FOREIGN PATENTS

| Number | Country | Date |
| --- | --- | --- |
| 3,312 | Great Britain | of 1878 |
| 24,619 | Norway | May 25, 1914 |